United States Patent
Chan et al.

(10) Patent No.: US 10,204,073 B2
(45) Date of Patent: *Feb. 12, 2019

(54) MANAGING ACTIONS OF A NETWORK DEVICE BASED ON POLICY SETTINGS CORRESPONDING TO A REMOVABLE WIRELESS COMMUNICATION DEVICE

(71) Applicant: PISMO LABS TECHNOLOGY LIMITED, Hong Kong (HK)

(72) Inventors: Alex Wing Hong Chan, Hong Kong (HK); Wan Chun Leung, Hong Kong (HK); Ho Ming Chan, Hong Kong (HK); Patrick Ho Wai Sung, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,672

(22) Filed: Nov. 3, 2015

(65) Prior Publication Data

US 2017/0126494 A1 May 4, 2017
US 2018/0131566 A9 May 10, 2018

Related U.S. Application Data

(63) Continuation of application No. 13/979,375, filed as application No. PCT/IB2012/053568 on Jul. 12, 2012, now Pat. No. 9,219,646.

(51) Int. Cl.
*G06F 13/42* (2006.01)
*H04L 12/24* (2006.01)
*G06F 13/40* (2006.01)

(52) U.S. Cl.
CPC ...... *G06F 13/4282* (2013.01); *G06F 13/4068* (2013.01); *H04L 41/0806* (2013.01); *H04L 41/0873* (2013.01); *H04L 41/0893* (2013.01)

(58) Field of Classification Search
CPC .......... H04L 41/0803–41/0809; H04L 41/0866–41/0873; H04L 61/2038; H04W 88/06

See application file for complete search history.

(56) References Cited

U.S. PATENT DOCUMENTS 8,713,630 B2   4/2014   Raleigh
2006/0294219 A1   12/2006   Ogawa et al.
(Continued)

FOREIGN PATENT DOCUMENTS

CN   101009590 A   8/2007
CN   101132326 A   2/2008
(Continued)

OTHER PUBLICATIONS

International Search Report in International Application No. PCT/IB2012/053568, dated Apr. 18, 2013.
(Continued)

*Primary Examiner* — Eric Myers
(74) *Attorney, Agent, or Firm* — FisherBroyles, LLP; Victoria Boyd

(57) ABSTRACT

A method and system for configuring a network device according to the identity of a plurality of removable wireless communications devices (RWCDs), the method comprising the steps of: determining the identities of the plurality of RWCDs; determining whether the network device is capable of using the plurality RWCDs; retrieving policy settings from an authorized party or a storage medium of the network device according to the identities of the plurality of RWCDs, determining priority of policy settings; and configuring the network device according to the policy settings. The priority of policy settings are based on the positions of the RWCDs when there are conflict among policy settings. The plurality of RWCDs are plugged to the network device and the (Continued)

network device provides wireless wide area network (WAN) connectivity through the plurality of RWCDs.

19 Claims, 3 Drawing Sheets

(56) References Cited

U.S. PATENT DOCUMENTS

| | | | |
|---|---|---|---|
| 2007/0067434 A1 | 3/2007 | Bahl | |
| 2007/0173283 A1* | 7/2007 | Livet | H04W 88/06 455/552.1 |
| 2012/0150750 A1* | 6/2012 | Law | G06Q 20/20 705/76 |
| 2014/0195681 A1* | 7/2014 | Chan | H04L 41/0809 709/225 |
| 2014/0235230 A1 | 8/2014 | Raleigh | |

FOREIGN PATENT DOCUMENTS

| | | |
|---|---|---|
| CN | 101945388 A | 1/2011 |
| CN | 202160285 U | 3/2012 |
| CN | 202282869 U | 6/2012 |
| WO | 2007/136863 A2 | 11/2007 |
| WO | 2010/075343 A2 | 7/2010 |

OTHER PUBLICATIONS

Written Opinion of the international Searching Authority in International Application No. PCT/IB2012/053568, dated Apr. 18, 2013.
First Office Action in Chinese Application No. 201280074623.2 dated Sep. 19, 2017.
Examination Report in UK Application No. GB1415037.9, dated Nov. 17, 2014.

* cited by examiner

MANAGING ACTIONS OF A NETWORK DEVICE BASED ON POLICY SETTINGS CORRESPONDING TO A REMOVABLE WIRELESS COMMUNICATION DEVICE

BACKGROUND OF THE INVENTION

Users of a removable wireless communication device (RWCD) may plug in the RWCD in a network device (ND) to allow the network device to provide network connectivity to other hosts through the ND. When the RWCD is plugged into the ND, the ND tries to communicate with the RWCD by using, for example, a device driver. When the ND is able to communicate with the RWCD, the ND then instructs the RWCD to establish a wireless network connection. Therefore, the ND can then connect to other hosts through the RWCD. There are many types of RWCDs, including LTE modem, 3G modem, WiFi modem, WiMAX modem, Zigbee modem, Bluetooth modem and different wireless protocol modems. The RWCD connects with the ND through an electrical interface, including parallel connection, serial connection, USB, PCI, Firewire and Thunderbolt. Two of the most known RWCDs are Vodafone Internet Stick and T-Mobile webConnect USB 3G Modem. A user, for example, can plug in the 1-Mobile webConnect USB 3G Modem into a USB port of a ND, such as a router, and configure the router to use the T-Mobile webConnect USB 3G Modem for establishing wide area network connection.

A RWCD has an identity, such as International Mobile Equipment Identity (IMEI), Media Access Control (MAC) address and/or a telephone number. The identity may also be associated with a user account and/or a user profile.

A user may use the same RWCD with different ND at different times. For example, the user may use the RWCD with an office ND when the user is in office, and may use the RWCD with a home ND when user is at home.

A ND may be used to connect with different RWCDs at different time. For example, the ND is connected with a first RWCD in the morning and connected with a second RWCD in the afternoon. A ND may also be connected with a plurality of RWCDs at the same time.

As a user may have his/her own preference settings when using his/her own RWCD with a ND, it is inconvenient for the user to configure the ND every time when a different RWCD is connected into the ND. The user may have different policy settings for the same RWCD when connecting to different NDs. Similarly an administrator of a ND may need to configure policy settings of the ND according to RWCDs connected to. This may consume a lot of the administrator's resources especially when the number of possible RWCDs that can be connected to the ND is large.

FIELD OF THE INVENTION

This disclosure relates in general to the field of computer networks. More particularly, the present invention relates to a method and a network device to manage actions of the network device by retrieving policy settings from an authorized party or from a storage medium of the network device according to identity of the removable wireless communications device connected to the network device.

SUMMARY OF THE INVENTION

The present disclosure provides a network device and a method to manage actions of a network device by retrieving policy settings to a network device according to the identity of connected removable wireless communications device.

The network device is composed of a device interface, a network interface, a processing unit(s), and a storage consisting of two parts, namely, the network device configuration storage and a policy settings storage. A simplified summary of the innovation's process flow is provided in the subsequent paragraphs of this section.

The identity of the connected removable wireless communications device is first determined. The identity of the removable wireless communications device is used for retrieving corresponding policy settings. The policy settings can either be retrieved from the policy settings storage of the network device or from an authorized party. The authorized party may be a host, a server, a network device or any electronic device that is capable of sending policy settings to the network device based on the identity of the removable wireless communications device provided by the network device.

DETAILED DESCRIPTION OF THE PREFERRED EMBODIMENTS

Figure 1A:
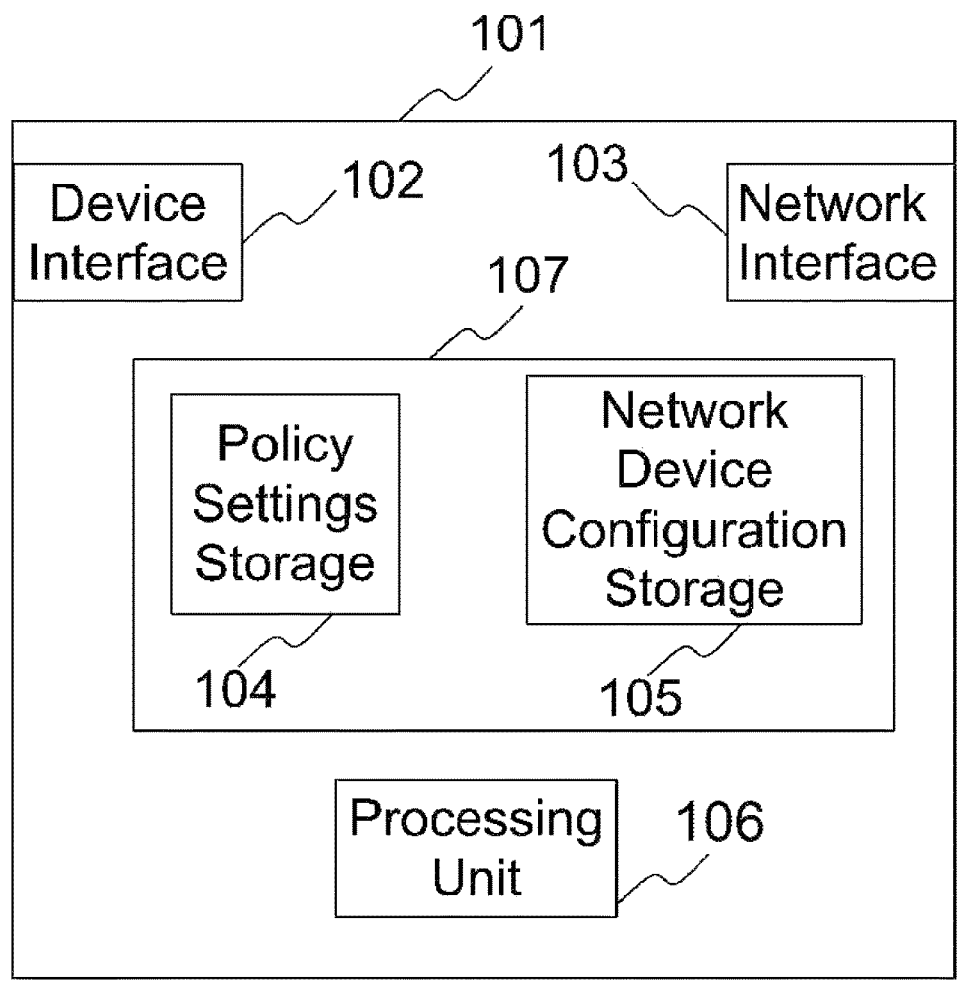
FIG. 1A is a block diagram of one example of an illustrative network device in accordance with the herein described systems and methods.

The ensuing description provides preferred exemplary embodiment(s) only and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1B:
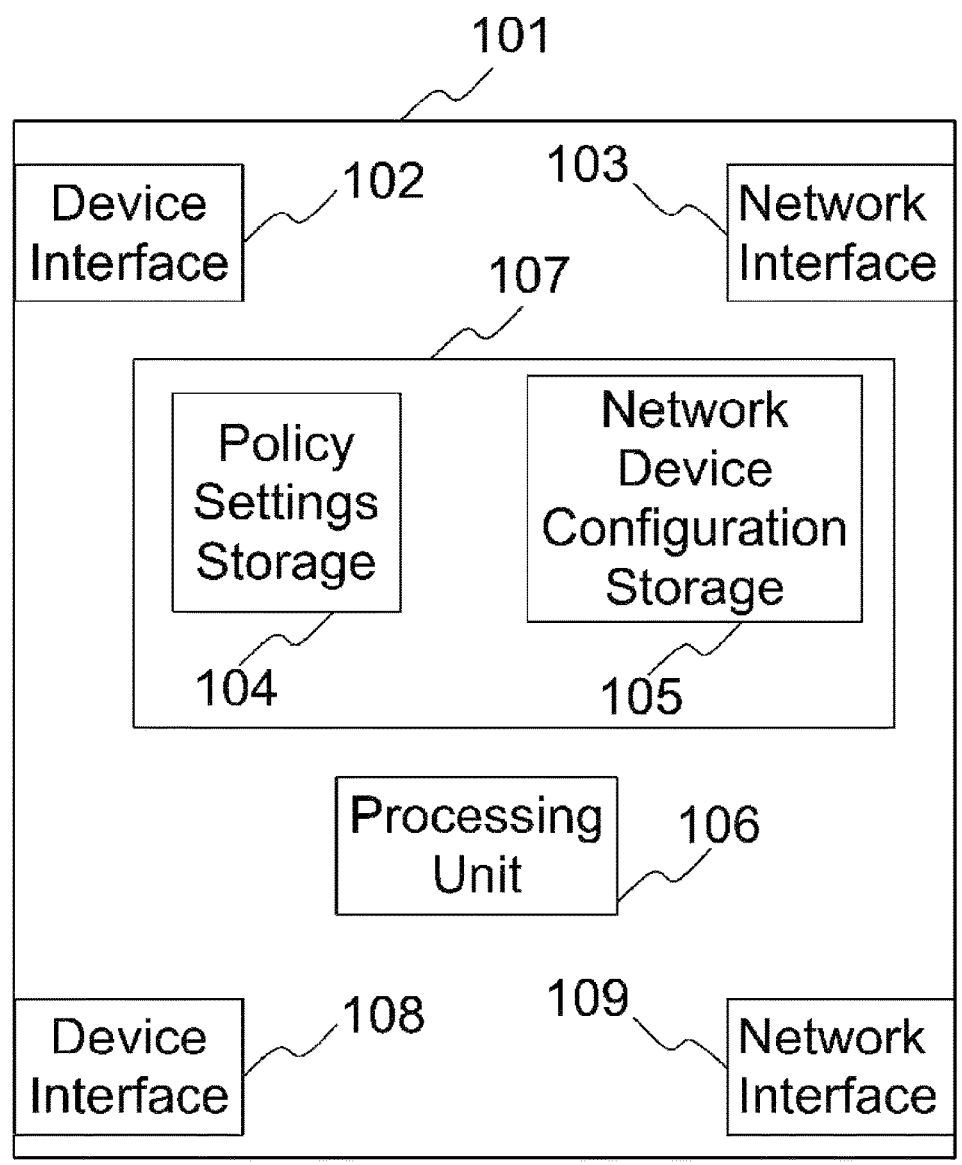
FIG. 1B is a block diagram of one example of an illustrative network device in accordance with the herein described systems and methods.

FIG. 1A and FIG. 1B are block diagrams of two examples of two illustrative network devices in accordance with the herein described systems and methods. The differences between FIG. 1A and FIG. 1B are that there are two device interfaces and two network interfaces in FIG. 1B and there is one device interface and one network interface in FIG. 1A. FIG. 1A and FIG. 1B are used to illustrate that the number of device interfaces and network interfaces in the present invention are not limited by the present invention.

A network interface, such as network interface 103 and 109, at an ND, such as network device 101, may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, or any other interface that is able to connect the ND with another network device.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network.

A device interface, such as device interface 102 and 108, at the ND, is a fiber optic interface, a cable interface, a serial bus interface, a parallel bus interface, an universal serial bus (USB) interface, Firewire interface, Thunderbolt interface, Peripheral Component Interconnect (PCI) interface, or any other interface that is able to connect the ND with another device.

A removable wireless communication device (RWCD) may be plugged to a device interface of a network device (ND) to allow the network device to communicate to other hosts wirelessly through the RWCD. There are many types of RWCD, including LTE modem, 3G modem, WiFi modem, WiMAX modem, Zigbee modem, Bluetooth modem and different wireless protocol modems. The RWCD connects with the ND through an electrical interface, including parallel connection, serial connection, USB, PCI, Firewire and Thunderbolt. The ND may provide local area network (LAN) connectivity or wide area network (WAN) connectivity through a RWCD. Two of the most known RWCDs are Vodafone Internet Stick and T-Mobile webConnect USB 3G Modem. A user, for example, can plug in T-Mobile webConnect USB 3G Modem into an USB port of a ND, such as a router, and configure the router to use T-Mobile webConnect USB 3G Modem for establishing wide area network connection.

A RWCD provides network connectivity using High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO or any other wireless technologies.

When the RWCD is removed from the device interface of the ND, the ND then no longer can communicate to other hosts wirelessly through the removed RWCD. Depending on the type of the RWCD and the ND, the RWCD may be plugged into or removed from device interface of the ND while the ND is in operation. It would be apparent to those skilled in the art that there are many methods and techniques, including using mechanical switch, change of voltage, change of current and etc., can be used to determine whether a RWCD is plugged into or removed from device interface.

Policy Settings

Policy settings can be name/value pairs. The name represents the name of a policy setting and the value represents the value of the policy setting. Policy setting values can be of virtually any data type, such as, for example, Boolean, integer, floating point, string, character, enumerated, etc. A policy is a set of usage rules, a set of commands, a set of parameters, or a set of criteria that is used to precisely define how the ND operates. There are many types of policy settings, including but not limited to, access policy settings, security policy settings, accounting policy settings, services policy settings, routing policy settings, wireless channel management policy settings, network traffic policy settings, Internet Protocol (IP) packet management policy settings, network address translation (NAT) policy settings, quality of service (QoS) policy settings, virtual private network (VPN) policy settings, etc. It would be apparent to those skilled in the art that there are many methods and techniques to define the name/value pairs of policy settings for different types of policy settings.

According to one of the embodiments of the present invention, the policy settings include settings to configure the service set identification (SSID) when ND allows hosts to connect to it through IEEE 802.11 standards. Therefore, a ND that operates as an IEEE 802.11 or WiFi access point provides local area network (LAN) connectivity through the SSID and uses the RWCD for wide area network (WAN) connectivity. The owner of the RWCD is able to restrict hosts that are allowed to use the RWCD by configuring policy settings, which are stored at the authorized party. In one variant, the policy settings include settings to allow the ND to establish one or more SSIDs. In one variant, the policy settings allow: the ND to provide IEEE 802.11 connectivity, the inclusion of the one or more SSIDs, the list of allowed hosts to be connected to the ND through the one or more SSIDs, the passwords associated with the one or more SSIDs, and/or indicating whether the one or more SSIDs are for broadcast or not. For example, a first policy settings retrieved by the ND corresponding to a first RWCD causes the ND to provide three SSIDs—one is without password, one is with password and one is with password to transmit and receive IP packets through a VPN; and a second policy settings retrieved by the ND corresponding to a second RWCD causes the ND to provide one SSID that only hosts with allowed Media Access Control address (MAC address) can be associated with the SSID. It would be apparent to those skilled in the art that there are many SSID based policy settings that can be created with the present invention.

Figure 2:
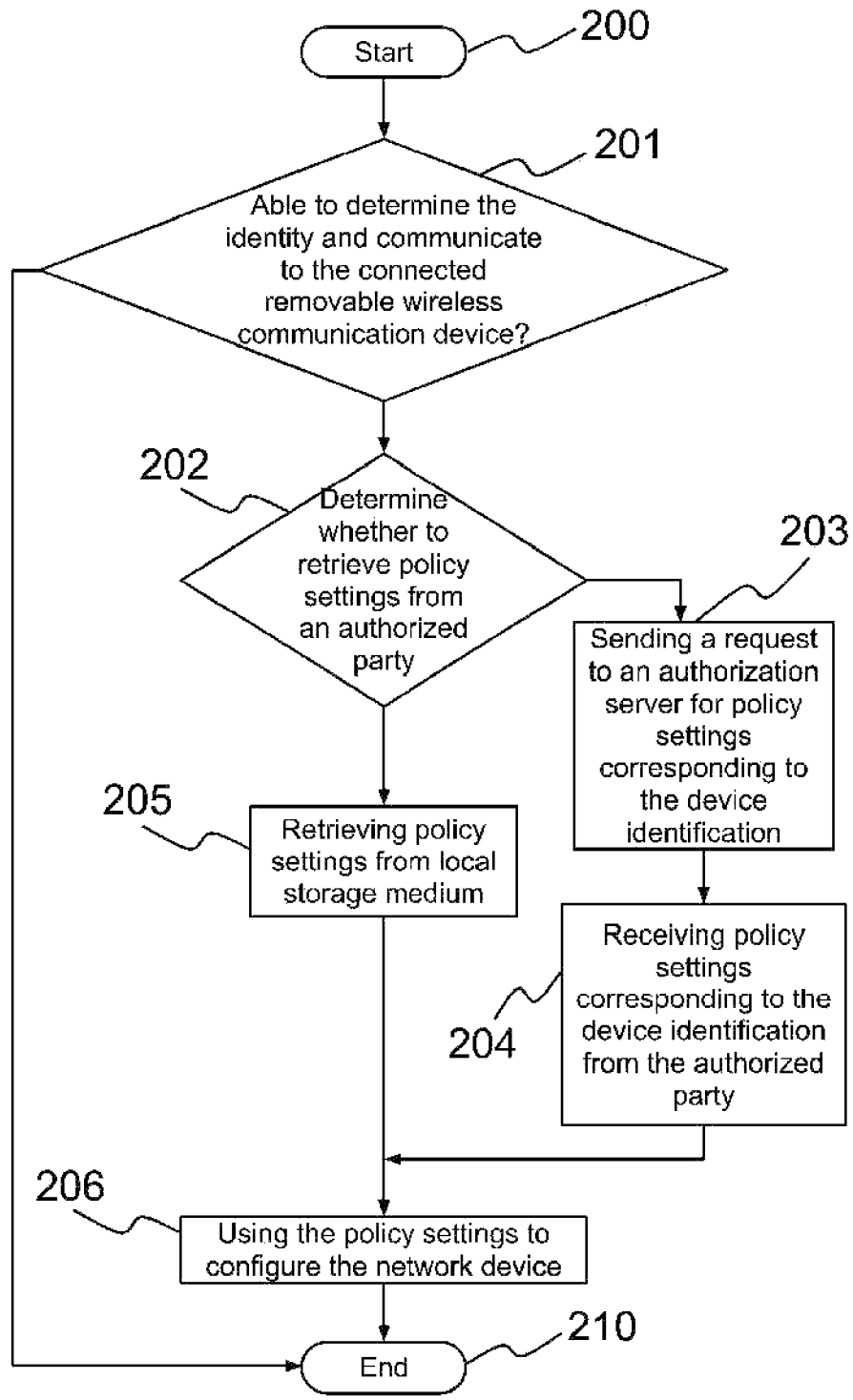
FIG. 2 is a flowchart of one example of an exemplary method to manage actions of a network device by retrieving policy settings from an authorized party or a storage medium of a network device in accordance with the herein described systems and methods.

FIG. 2 illustrates a flowchart in which various embodiments of the present invention may be practiced. The flow chart starts at step 200. At step 201, a ND determines the identity of the RWCD and whether the ND can communicate with the RWCD. There are many methods for the ND to carry out the step 201. In one variant, the operation system of the ND determines whether the operation system is able to communicate with the RWCD and reads the identity of the RWCD. In one variant, the processing unit of the ND determines whether the processing unit is able to communicate with the RWCD and reads the identity of the RWCD. If the ND is not able to communicate with the RWCD or to retrieve the identity of the RWCD, no policy settings corresponding to the RWCD is used and the flow chart stops at step 210. The reason why the ND is not able to communicate with the RWCD or is not able to retrieve the identity may be due to incompatible device driver, unrecognized commands, or other reasons. It would be apparent to those skilled in the art that many methods and techniques can be used to determine the identity of the RWCD and determine whether the ND can communicate with the RWCD.

At step 202, the ND determines whether to retrieve policy settings from an authorized party or from a storage medium according to the identity of the RWCD. In one variant, the ND determines to retrieve the policy settings from an authorized party at step 203 if it is the first time that the ND has identified the identity of the RWCD because there is no corresponding policy setting retrieved before for the identity. In one variant, the ND determines to retrieve the policy settings from its storage medium at step 205 if the corresponding policy settings of the identity have been stored in the ND less than for a pre-defined period of time. In one variant, the ND determines to retrieve the policy settings regardless of whether the ND identified the identity before. It would be apparent to those skilled in the art that the benefit of retrieving policy settings from the authorized party ensures that the policy settings are the most updated while retrieving policy settings from the storage medium of the ND allows quick usage of the policy settings.

When the ND determines to retrieve policy settings from an authorized party, the ND sends a request to the authorized party for retrieving the policy settings corresponding to the identity at step 203. The request includes the identity. Therefore the authorized party can reply with the request by sending the ND policy settings corresponding to the identity received. If the authorized party does not have policy setting corresponding to the identity, the authorized party may reply with a message indicating that there is no corresponding policy setting, reply with an error message or not reply with anything. It would be apparent to those skilled in the art that many methods and techniques can be used to indicate that there is no corresponding policy setting. The ND then receives policy settings from the authorized party at step 204.

At step 206, the ND uses the policy settings, which are either retrieved from the storage medium or from the authorized party, to configure the ND. In one variant, if for whatever reasons, such as policy settings corruption and error in retrieving policy settings, there is no policy setting available at step 206, the ND does not allow the use of the corresponding RWCD and does not change its configuration. When the ND has been configured with the retrieved policy settings, the ND is then able to communicate with wireless networks, such 3G, 4G, WiMAX, WiFi, Zigbee, Bluetooth, LTE, and HSPDA, through the RWCD.

According to one of the implementations of present invention, if there is no policy setting retrieved from the authorized party or from storage medium of the network device, the RWCD is not being used for connecting to other hosts. According to one of the implementations of present invention, if there is no policy setting retrieved from the authorized party or from storage medium of the network device, the RWCD is used according to default policy settings, which is either provided by the manufacturer of the network device, inputted by a person or retrieved from an authorized party. According to one of the implementations of present invention, if there is no policy setting retrieved from the authorized party or from storage medium of the network device, the RWCD is used according to policy settings determined by the administrator of the network device.

Conflict of Policy Settings

When there are more than one RWCD connected to the ND, policy settings retrieved for one RWCD (First Policy Settings) may have conflicts against another group of policy settings retrieved for another RWCD (Second Policy Settings). It is well known to those skilled in the art to assign priorities to policy settings. However, such practice is only for assigning priorities among one group of policy settings. According to one of the embodiments of present invention, when there are conflicts among two groups of policy settings corresponding to different RWCDs, such as First Policy Settings and Second Policy Settings, the ND determines which group of policy settings, for example either First Policy Settings or Second Policy Settings, has higher priority according to one or more of the followings: the information retrieved from the authorized party, the physical positions of the RWCDs at the ND, pre-determined settings inputted into the storage medium of the ND, the chronological order when the RWCDs were connected with the ND, and the identity of the RWCDs. Using the First Policy Settings and the Second Policy Settings for another example, there are three policy settings in the First Policy Settings, from the highest, namely policy setting A1, policy setting A2, and policy setting A3 and two policy settings in the Second Policy Settings from the highest namely policy setting B1 and policy setting B2. If the First Policy Settings has higher priority than the Second Policy Settings, then the priority of the policy settings from the highest is A1, A2, A3, B1 and B2.

Determining Whether to Use the Received Policy Settings

According to one of the embodiments of present invention, when a ND has received the policy settings, the ND executes the received policy settings without further confirmation. According to one of the embodiments of present invention, when a ND has received the policy settings, the ND executes the received policy settings only after a confirmation is received. The requirement of confirmation allows the administrator of the ND to approve or disapprove the execution of policy settings and/or the RWCD as it is possible that a RWCD is plugged into the ND without an approval from the administrator. In one variant, before executing the received policy settings, the ND sends an email or electronic message to a recipient and asks the recipient to confirm that the policy settings can now be used. In one variant, before executing the policy settings, a confirmation has to be received by the ND, for example through a web page, an email, a SMS, an instant message, or other forms of signals to confirm that the policy settings can now be used or executed. It would be apparent to those skilled in the art that there are many methods and techniques to send a confirmation to the ND.

According to one of the embodiments of the present invention, the identity of the RWCD is International Mobile Equipment Identity (IMEI). The ND may determine the IMEI associated with the RWCD, for example, by using AT commands or by using device driver. It would be apparent to those skilled in the art that many methods and techniques can be used to determine the IMEI of the RWCD.

According to one of the embodiments of the present invention, the identity of the RWCD, for example, is Media Access Control (MAC) address. The ND may determine the MAC address associated with the RWCD, for example, by network driver interface specification. It would be apparent to those skilled in the art that many methods and techniques can be used to determine the MAC address of the RWCD.

According to one of the embodiments of the present invention, the identity of the RWCD, for example, is a telephone number. The ND may determine the telephone number associated with the RWCD, for example, by using AT commands or by using device driver. It would be apparent to those skilled in the art that many methods and techniques can be used to determine the phone number of the RWCD.

According to one of the embodiments of the present invention, when the ND sends a request to the authorized party, the request includes authentication information to assist the authorized party to determine whether the request is an authenticated request. The requirement of the authentication information reduces the probability of unauthenticated use of the RWCD. The authentication information may be a password, hashed password, digital certificate, public key or private key. It would be apparent to those skilled in the art to state one or more authentication information in the request. The authentication information may be retrieved from a RWCD, retrieved from a storage medium of the ND, or inputted by a user of the ND.

According to one of the embodiments of the present invention, an authorized party may be a host, a server, a network device or any electronic device that is capable of sending policy settings to the ND based on the identity of a RWCD provided by the ND. In one variant, the authorized party does not provide the policy settings unless the request includes correct authentication information.

According to one of the embodiments of the present invention; the ND does not submit a request to the authorized party for policy settings corresponding to an identity if there are policy settings corresponding to the identity stored in the storage medium of the ND. This reduces the need to retrieve policy settings from an authorized party through an accessible network. According to one of the embodiments of the present invention, the ND removes stored policy settings from its storage medium after a pre-defined period of time. The value of the pre-defined period of time may be included in the policy settings, entered by the manufacturer of the ND or inputted by a user of the ND. When the policy settings are removed from the storage medium of the ND, the ND submits a request to the authorized party for policy settings corresponding to the identity when the identity is identified after the RWCD is plugged into the ND.

FIG. 1a and FIG. 1b are block diagrams of two illustrative network devices in accordance with the herein described systems and methods. FIG. 1b has one more device interface and one more network interface than of the network device illustrated in FIG. 1a.

The network device 101 comprises a processing unit(s) 106, a storage device 107, one or more device interfaces 102 and 107, and one or more network interfaces 103 and 108, for use with other network apparatus such as Ethernet switches, IP routers and other packet network devices, network management and provisioning systems, local PCs, etc. Other components which may be utilized within the network device 101 include amplifiers, board level electronic components, as well as media processors and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required.

Policy settings storage 104 is used to store policy settings that are retrieved from an authorized party. Policy settings storage 104 is implemented by using a storage medium. Policy Settings Storage 104 is part of network device 101. Network device configuration storage 105 is also implemented by using a storage medium and is used to store configuration unrelated to policy settings, such as static IP address and MAC address. It is possible that there are conflicts between policy settings stored in policy settings storage 104 and configurations stored in network device configuration storage 105. It would be apparent to those skilled in the art to assign priorities to policy settings and configurations to resolve conflicts. According to one of the embodiments of present invention, policy settings storage 104 and network device configuration storage 105 are both part of storage device 107. Storage device 107 is also used to store data and executable instructions for processing unit(s) 106. Storage device 107 is implemented by using at least one storage medium and is readable by processing unit(s). According to one of the embodiments of present invention, policy settings storage 104 and network device configuration storage 105 are both part of storage device 107 but storage device 107 is consisted of more than one storage medium.

Processing unit(s) 106 is implemented by using one or more central processing units, network processors, microprocessors, micro-controllers, FPGAs, ASICs or any device capable of performing instructions to perform the basic arithmetical, logical, and input/output operations of the system.

Embodiments, or portions thereof, may be embodied in program or code segments operable upon a system with processing unit(s) (e.g. computer/processing system or computing platform) for performing functions and operations described herein. The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Processing unit(s) 106 monitors all device interlaces, such as device interfaces 102 and 108, to determine whether one or more removable wireless communication devices (RW-CDs) are connected with network device 101. When it is found that there are one or more RWCDs, processing unit(s) 106 tries to establish connections with the RWCDs to ensure the RWCDs are compatible and can be used for communicating with other hosts. According to one of the embodiments of the present invention, when processing unit(s) 106 determines to retrieves policy settings from an authorized party, processing unit(s) 106 retrieves the policy settings through accessible networks through one or more RWCDs connected or through network interfaces, such as network interfaces 103 and 108. In one variant, during the retrieval of the policy settings through the one or more RWCD, the ND does not allow the use of the RWCD, whose corresponding policy settings have not been retrieved yet, for any other communication purposes other than the retrieval of the policy settings from the authorized party.

Processing unit(s) 106 executes the policy settings according to the priority of policy settings according to policy settings retrieved from policy settings storage 104 and configurations from network device configuration storage 105. The priority is necessary as there may be conflicts among policy settings and configurations from network device.

Processing unit(s) 106 determines whether to retrieve policy settings from policy settings storage 104 or an authorized party. According to one of the embodiments of present invention, processing unit(s) 106 retrieve policy settings from policy settings storage 104 if there are policy settings corresponding to the RWCD already stored in policy settings storage 104. When policy settings have been retrieved from an authorized party, processing unit(s) 106 stores the policy settings in policy settings storage 104. According to one of the embodiments of present invention, processing unit(s) 106 retrieves policy settings from policy settings storage 104 if there are policy settings corresponding to the RWCD already stored in policy settings storage 104. According to one of the embodiments of present invention, processing unit(s) 106 retrieve policy settings from policy settings storage 104 if there are policy settings corresponding to the RWCD already stored in policy settings storage 104 and the time period of the storage is no longer than a pre-defined value, which is stored in network device configuration storage 105.

According to one of the embodiments of present invention, processing unit(s) 106 executes policy settings after receiving a confirmation. In one variant, the confirmation is received through an accessible network connecting with a RWCD or a network interface. In another variant, the confirmation is received through a device interface, such as serial console.

According to one of the embodiments of present invention, processing unit(s) 106 establish one or more SSIDs according to policy settings retrieved. Processing unit(s) 106 then uses one or more of the network interfaces, such as network interface 103 and 109, to provide network connectivity to hosts through one IEEE 802.11 standards and the one or more SSIDs.

According to one of the embodiments of present invention, processing unit(s) 106 sends a request with the identity of the RWCD to an authorized party to retrieve policy settings from the an authorized party. The identity of the RWCD is retrieved from the RWCD and the types of identity include, but not limited to, IMEI, MAC address and phone number. According to one of the embodiments of present invention, the request sent to the authorized party by processing unit(s) 106 include authentication information, such as password, hashed password, digital certificate, public key and private key.

The invention claimed is:

1. A method for configuring a network device according to the identity of a plurality of removable wireless communications devices (RWCDs), the method comprising the steps of:
   (a) determining the identities of the plurality of RWCDS, wherein identities are based on one or more of International Mobile Equipment Identity (IMEI), Media Access Control (MAC) address, a telephone number, a user account, and a user profile;
   (b) determining whether the network device is capable of using the plurality of RWCDs;
   (c) retrieving policy settings from an authorized party or a storage medium of the network device according to the identities of the plurality of RWCDs;
   (d) determining whether there are conflicts among groups of the policy settings;
   (e) determining priorities of groups of the policy settings when there are conflicts among the groups of the policy settings; wherein the priorities of the groups of the policy settings are based on at least one of the following: information retrieved from the authorized party, physical positions of the plurality of RWCDs at the network device, pre-determined settings inputted into the storage medium, chronological order in which the plurality of RWCDs were connected with the network device, and the identities of the plurality of RWCDs; and
   (f) configuring the network device according to at least one of the groups of the policy settings;
   wherein the plurality of RWCDs are plugged to the network device; and
   wherein the network device provides wireless wide area network (WAN) connectivity through the plurality of RWCDs.

2. The method of claim 1, wherein the network device is wireless access point.

3. The method of claim 2, wherein the policy settings include settings to configure one or more service set identification (SSIDs) and passwords associated with the SSIDs.

4. The method of claim 1, wherein the plurality of RWCD are capable of being plugged in or removed from the network device while the network device is in operation.

5. The method of claim 1, further comprising confirming which at least one group of policy settings, from the policy settings retrieved, to use for configuring the network device in step (f).

6. The method of claim 1, wherein the network device comprises one or more network interfaces.

7. The method of claim 1, wherein when the identities of the plurality of RWCDs is based on an IMEI, the IMEI is determined using AT commands or by using device driver; and wherein when the identities of the plurality of RWCD is a telephone number, the telephone number is determined using AT commands or by using device driver.

8. The method of claim 1, further comprising removing the policy settings after a pre-defined period of time from the storage medium of the network device and submitting a request to the authorized party for policy settings corresponding to the identities of the plurality of RWCDs.

9. The method of claim 1, further comprising:
   not using a first RWCDs for any other communication purposes other than performing step (c) when policy settings of the first RWCDs are corrupted.

10. The method of claim 1, wherein the plurality of RWCDs are plugged to universal serial bus (USB) interface of the network device.

11. A network device, comprising:
   at least one device interface, which is used to connect to at least one removable wireless communication device (RWCD);
   at least one network interface;
   at least one processing unit; and
   at least one storage medium comprising program instructions executable by the at least one processing unit for configuring the network device according to the identity of the plurality of removable wireless communications devices (RWCDs), comprising the steps of:
   (a) determining the identities of the plurality of RWCDs; wherein identities are based on one or more of International Mobile Equipment Identity (IMEI), Media Access Control (MAC) address, a telephone number, a user account, and a user profile;
   (b) determining whether the network device is capable of using the plurality of RWCDs;
   (c) retrieving policy settings from an authorized party or the at least one storage medium of the network device according to the identities of the plurality of RWCDs;
   (d) determining whether there are conflicts among groups of the policy settings;
   (e) determining priorities of groups of the policy settings when there are conflicts among the groups of the policy settings; wherein the priorities of the groups of the policy settings are based on at least one of the following: information retrieved from the authorized party, physical positions of the plurality of RWCDs at the network device, pre-determined settings inputted into the storage medium, chronological order in which the plurality of RWCDs were connected with the network device, and the identities of the plurality of RWCDs; and
   (f) configuring the network device according to at least one of the groups of the policy settings;
   wherein the plurality of RWCDs are plugged to the network device; and
   wherein the network device provides wireless wide area network (WAN) connectivity through the plurality of RWCDs.

12. The network device of claim 11, wherein the network device is wireless access point.

13. The network device of claim 12, wherein the policy settings include settings to configure one or more service set identification (SSIDs) and passwords associated with the SSIDs.

14. The network device of claim 11, wherein the plurality of RWCDs are capable of being plugged in or removed from the network device while the network device is in operation.

15. The network device of claim 11, the at least one storage medium further comprising program instructions executable by the at least one processing unit for confirming which at least one group of policy settings, to use for configuring the network device in step (f).

16. The network device of claim 11, wherein when the identities of the plurality of RWCDs is based on an IMEI, the IMEI is determined using AT commands or by using device driver; and wherein when the identities of the plurality of RWCD is a telephone number, the telephone number is determined using AT commands or by using device driver.

17. The network device of claim 11, the at least one storage medium further comprising program instructions executable by the at least one processing unit for removing the policy settings after a pre-defined period of time from the at least one storage medium of the network device and submitting a request to the authorized party for policy settings corresponding to the identities of the plurality of RWCDs.

18. The network device of claim 11, the at least one storage medium further comprising program instructions executable by the at least one processing unit for: not using a first RWCDs for any other communication purposes other than performing step (c) when policy settings of the first RWCDs are corrupted.

19. The network device of claim 11, wherein the plurality of RWCDs are plugged to universal serial bus (USB) interface of the network device.

* * * * *